US010934069B2

(12) United States Patent
Clark et al.

(10) Patent No.: US 10,934,069 B2
(45) Date of Patent: Mar. 2, 2021

(54) SEALING MEMBER FOR USE WITH FAT CONTAINING COMPOSITIONS (71) Applicant: Selig Sealing Products, Inc., Forrest, IL (US)

(72) Inventors: Eric Clark, Normal, IL (US); Benjamin James Harrop, Brock Hill (GB)

(73) Assignee: Selig Sealing Products, Inc., Forrest, IL (US)

( * ) Notice: Subject to any disclaimer, the term of this patent is extended or adjusted under 35 U.S.C. 154(b) by 0 days.

(21) Appl. No.: 16/345,048

(22) PCT Filed: Oct. 27, 2017

(86) PCT No.: PCT/US2017/058721
§ 371 (c)(1),
(2) Date: Apr. 25, 2019

(87) PCT Pub. No.: WO2018/081533
PCT Pub. Date: May 3, 2018

(65) Prior Publication Data
US 2019/0276209 A1  Sep. 12, 2019

Related U.S. Application Data (60) Provisional application No. 62/414,565, filed on Oct. 28, 2016.

(51) Int. Cl.
*B65D 53/04* (2006.01)
*B32B 5/18* (2006.01)
(Continued)

(52) U.S. Cl.
CPC ............... *B65D 53/04* (2013.01); *B32B 5/18* (2013.01); *B32B 15/00* (2013.01); *B32B 15/04* (2013.01);
(Continued)

(58) Field of Classification Search
CPC .... B65D 53/04; B65D 77/2024; B65D 25/14; B32B 5/18; B32B 15/085; B32B 27/32;
(Continued)

(56) References Cited

U.S. PATENT DOCUMENTS 1,818,379 A  8/1931  Cain
2,768,762 A  10/1956  Guinet
(Continued)

FOREIGN PATENT DOCUMENTS

AT  501393 A1  8/2006
AT  11738 U1  4/2011
(Continued)

OTHER PUBLICATIONS

Patent Cooperation Treaty, International Search Report and Written Opinion of the International Search Authority for International Application PCT/US2017/058721 dated Jan. 17, 2018, 14 pages.
(Continued)

*Primary Examiner* — Michael C Miggins
(74) *Attorney, Agent, or Firm* — Fitch, Even, Tabin & Flannery, LLP (57) ABSTRACT

A sealing member for a container is provided having a bottom heat sealable layer. The sealing members herein may be suitable for sealing on glass containers and/or for use with fat and oil containing materials. The heat sealable layer may include ethylene acrylic acid and a polyolefin plastomer.

20 Claims, 4 Drawing Sheets

(51) Int. Cl.
  *B32B 15/085* (2006.01)
  *B32B 27/32* (2006.01)
  *B65D 25/14* (2006.01)
  *B32B 15/08* (2006.01)
  *B32B 15/04* (2006.01)
  *B65D 77/20* (2006.01)
  *B32B 15/00* (2006.01)

(52) U.S. Cl.
  CPC ............ *B32B 15/08* (2013.01); *B32B 15/085* (2013.01); *B32B 27/32* (2013.01); *B65D 25/14* (2013.01); *B65D 77/2024* (2013.01); *B32B 2250/03* (2013.01); *B32B 2266/0214* (2013.01); *B32B 2307/31* (2013.01); *B32B 2553/00* (2013.01)

(58) Field of Classification Search
  CPC ......... B32B 15/08; B32B 15/04; B32B 15/00; B32B 2250/03; B32B 2266/0214; B32B 2307/31; B32B 2553/00
  See application file for complete search history.

(56) References Cited

U.S. PATENT DOCUMENTS

| | | |
|---|---|---|
| 3,235,165 A | 2/1966 | Jackson |
| 3,292,828 A | 12/1966 | Stuart |
| 3,302,818 A | 2/1967 | Balocca et al. |
| 3,460,310 A | 8/1969 | Adcock et al. |
| 3,556,816 A | 1/1971 | Nughes |
| 3,964,670 A | 6/1976 | Amneus |
| 3,990,603 A | 11/1976 | Brochman |
| 4,133,796 A | 1/1979 | Bullman |
| 4,206,165 A | 6/1980 | Dukess |
| 4,266,687 A | 5/1981 | Cummings |
| 4,396,655 A | 8/1983 | Graham et al. |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene et al. |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,934,544 A | 6/1990 | Han |
| 4,938,390 A | 7/1990 | Markva |
| 4,960,216 A | 10/1990 | Giles |
| 4,961,986 A | 10/1990 | Galda |
| 5,004,111 A | 4/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A | 12/1997 | Giles |
| 5,709,310 A | 1/1998 | Kretz |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,290,801 B1 | 9/2001 | Krampe |
| 6,312,776 B1 | 11/2001 | Finkelstein |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Wolf |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | McLean |
| 8,308,003 B2 | 11/2012 | O'Brien |
| 8,329,288 B2 | 12/2012 | Allegaert |
| 8,348,082 B2 | 1/2013 | Cain |
| 8,541,081 B1 | 9/2013 | Ranganathan |
| 8,715,825 B2 | 5/2014 | Thorstensen-Woll |

(56) References Cited

U.S. PATENT DOCUMENTS

| | | |
|---|---|---|
| 8,906,185 B2 | 12/2014 | McLean |
| 8,944,264 B2 | 2/2015 | Frishman |
| 9,028,963 B2 | 5/2015 | Thorstensen-Woll |
| 9,102,438 B2 | 8/2015 | Thorstensen-Woll |
| 9,193,513 B2 | 11/2015 | Thorstensen-Woll |
| 9,221,579 B2 | 12/2015 | Thorstensen-Woll |
| 9,227,755 B2 | 1/2016 | Thorstensen-Woll |
| 9,440,765 B2 | 9/2016 | Thorstensen-Woll |
| 9,440,768 B2 | 9/2016 | Thorstensen-Woll |
| 9,533,805 B2 | 1/2017 | McLean |
| 9,676,513 B2 | 6/2017 | Thorstensen-Woll |
| 2001/0023870 A1 | 9/2001 | Mihalov |
| 2001/0031348 A1 | 10/2001 | Jud |
| 2002/0028326 A1 | 3/2002 | Lhila |
| 2002/0068140 A1 | 6/2002 | Finkelstein |
| 2003/0087057 A1 | 5/2003 | Blemberg |
| 2003/0168423 A1 | 9/2003 | Williams |
| 2003/0196418 A1 | 10/2003 | O'Brien |
| 2004/0028851 A1 | 2/2004 | Okhai |
| 2004/0043238 A1 | 3/2004 | Wuest |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0208242 A1 | 9/2005 | Smelko |
| 2005/0208244 A1 | 9/2005 | Delmas |
| 2005/0218143 A1 | 10/2005 | Niederer |
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0135159 A1 | 6/2008 | Bries |
| 2008/0145581 A1 | 6/2008 | Tanny |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0070636 A1 | 3/2012 | Thorstensen-Woll |
| 2012/0103988 A1 | 5/2012 | Wiening |
| 2012/0111758 A1 | 5/2012 | Lo |
| 2012/0241449 A1 | 9/2012 | Frischmann |
| 2012/0285920 A1 | 11/2012 | McLean |
| 2012/0312818 A1 | 12/2012 | Ekkert |
| 2013/0020324 A1 | 1/2013 | Thorstensen-Wolf |
| 2013/0020328 A1 | 1/2013 | Duan et al. |
| 2013/0045376 A1 | 2/2013 | Chen |
| 2013/0121623 A1 | 5/2013 | Lyzenga |
| 2013/0177263 A1 | 7/2013 | Duan |
| 2014/0001185 A1 | 1/2014 | McLean |
| 2014/0061196 A1 | 3/2014 | Thorstensen-Woll |
| 2014/0061197 A1 | 3/2014 | Thorstensen-Woll |
| 2014/0186589 A1 | 7/2014 | Chang |
| 2014/0224800 A1 | 8/2014 | Thorstensen-Woll |
| 2015/0053680 A1 | 2/2015 | Yuno et al. |
| 2015/0197385 A1 | 7/2015 | Wei |
| 2015/0225116 A1 | 8/2015 | Thorstensen-Woll |
| 2015/0321808 A1 | 11/2015 | Thorstensen-Woll |
| 2016/0185485 A1 | 6/2016 | Thorstensen-Woll et al. |
| 2017/0253373 A1 | 9/2017 | Thorstensen-Woll |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 103193026 A | 7/2013 |
| CN | 104853994 A | 8/2015 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| KR | 100711073 B1 | 4/2007 |

(56) References Cited

FOREIGN PATENT DOCUMENTS

| | | |
|---|---|---|
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9905041 A1 | 2/1999 |
| WO | 0066450 A1 | 11/2000 |
| WO | 2005009868 A1 | 2/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |
| WO | 2015119988 A1 | 8/2015 |
| WO | 2017155946 A1 | 9/2017 |

OTHER PUBLICATIONS

U.S. Appl. No. 15/554,240, entitled "Enhancements for Tabbed Seal," filed Sep. 9, 2019.

U.S. Appl. No. 16/736,912, entitled "Tabbed Seal Concepts," filed Jan. 8, 2020, which published as US 2020/0140176 A1 on May 7, 2020, which is a Continuation of U.S. Appl. No. 15/554,240, entitled "Tabbed Seal Concepts," which entered the U.S. national phase from International Application No. PCT/US2016/020666, filed on Mar. 3, 2016, which published as US 2018/0079576 A1 on Mar. 22,2018.

U.S. Appl. No. 15/107,560, entitled "Dual Aluminum Tamper Indicating Tabbed Sealing Member," which entered the U.S. national phase from International Application No. PCT/US2015/014363, filed on Feb. 4, 2015, which published as US 2016/0325896 A1 on Nov. 10, 2016.

U.S. Appl. No. 15/554,240, entitled "Tabbed Seal Concepts," which entered the U.S. national phase from International Application No. PCT/US2016/020666, filed on Mar. 3, 2016, which published as US 2018/0079576 A1 on Mar. 22, 2018.

U.S. Appl. No. 15/794,719, entitled "Tabbed Inner Seal," filed Oct. 26, 2017, which published as US 2018/0118439 A1 on May 3, 2018.

U.S. Appl. No. 15/998,855, entitled "Tabbed Seal for Beverage Pod," filed Aug. 17, 2018, which published as US 2019/0055070 A1 on Feb. 21, 2019.

U.S. Appl. No. 16/197,753, entitled "Inner Seal With a Sub Tab Layer," filed Nov. 21, 2018, which is a continuation of U.S. Appl. No. 15/598,780, entitled "Inner Seal With a Sub Tab Layer," filed May 18, 2017, which published as US 2017/0253373 A1 on Sep. 7, 2017 and issued as U.S. Pat. No. 10/150,589 B2 on Dec. 11, 2018, which is a continuation of U.S. Appl. No. 14/208,122, entitled "Inner Seal With a Saub Tab Layer," filed Mar. 13, 2014, which published as US 2014/0263323 A1 on Sep. 18, 2014 and issued as U.S. Pat. No. 9,676,513 B2 on Jun. 13, 2017.

U.S. Appl. No. 16/262,406, entitled "Tamper Evident Tabbed Sealing Member Having a Foamed Polymer Layer," filed Jan. 30, 2019, which is a division of U.S. Appl. No. 14/706,263, entitled "Tamper Evident Tabbed Sealing Member Having a Foamed Polymer Layer," filed May 7, 2015, which published as US 2015/0232229 A1 on Aug. 20, 2015 and issued as U.S. Pat. No. 10,196,174 on Feb. 5, 2019, which is a Divsion of U.S. Appl. No. 13/603,998, entitled "Tamper Evident Tabbed Sealing Member Having a Foamed Polymer Layer," which published as US 2014/0061196 A1 on Mar. 6, 2014 and issued as U.S. Pat. No. 9,028,963 B2 on May 12, 2015.

U.S. Appl. No. 16/345,002, entitled "Single Aluminum Tamper Indicating Tabbed Sealing Member," which entered the U.S. national phase from International Application No. PCT/US2024/058521, filed on Oct. 26, 2017.

European Patent Office, Extended European Search Report for European Application EP 17865829.0 dated Apr. 8, 2020, 9 pages.

SEALING MEMBER FOR USE WITH FAT CONTAINING COMPOSITIONS

CROSS-REFERENCE TO RELATED APPLICATIONS

This application is a U.S. national phase application filed under 35 U.S.C. § 371 of International Application Number PCT/US2017/058721, filed Oct. 27, 2017, designating the United States, which claims the benefit of U.S. Provisional Application No. 62/414,565, filed Oct. 28, 2016.

FIELD

The disclosure relates to a laminate and sealing member for closing the mouth of a container, and more particularly, to a sealing member suitable for use with fat containing compositions.

BACKGROUND

It is often desirable to seal the opening of a bottle, jar or other container opening using a sealing member or inner seal to maintain freshness and/or to indicate whether the container has been tampered with. Often a cap or other closure is then screwed or placed on the neck or other container opening. In use, a consumer typically removes the cap or other closure to gain access to the seal and removes or otherwise peels the seal from the container in order to dispense or gain access to its contents.

Initial attempts at sealing a container opening included an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or upper surface surrounding a container's opening. Upon exposing the seal to heat, the lower layer bonds to the container rim. In many cases, these seals included a foil layer to provide induction heat to activate the lower heat seal layer.

These prior seals tended to provide good sealing, but recent changes have been instituted in a number of countries limiting the types of materials that may come into contact with food and other compositions. For example, previously, a number of sealing members included paraffinic waxes in the heat seal. However, paraffinic waxes are no longer allowed to be in contact with certain foods and other compositions in some countries. Similarly, there are also regulations in a number of countries regarding the permissible migration from containers and seals into compositions, such as food and other comestibles.

Further, certain foods may be especially problematic for maintaining an adequate seal over time. For example, some fatty or fat containing compositions can be problematic as fats, oils, and the like can degrade the seal. This can be particularly problematic during shipping and storage when the contents of the container may be in direct contact with the seal, such as when a container is stored or shipped on its side.

Moreover, many containers are made of materials that may be dissimilar to the sealing member. For example, glass containers may be especially problematic for sealing with polymer containing seals compared to when a polymer containing seal is used with a polymer container. Glass containers also include various treatments and/or coatings for helping preserve the contents of the containers, reduce degradation of the lids, and the like. For example, some glass containers may include hydrophobic coatings, silane coatings, and other coatings that present difficulties for maintain a proper seal.

DETAILED DESCRIPTION

For simplicity, this disclosure generally refers to a sealing member for use with a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter.

It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, or other layer, may be used to temporarily bond the sealing member to a liner. Other types of releasable layers may also be used to provide a temporary bond between the seal and liner.

It should be appreciated that, in some forms, the sealing members described herein may be suitable for providing a hermetic seal to glass containers that can be removed by the end consumer by pulling the seal from the container. Further, in some forms, the heat sealable layer is suitable for use in direct contact with fatty food (no waxes contained, neither paraffinic nor micro-crystalline) as the requirements of the EU Regulation EC October 2011 for direct contact with fatty food may be met. According to some forms, the seal stability and/or leakage ratio of the sealing member may be improved compared to other sealing members that use wax containing heatseal layers, especially when used in direct contact with fatty materials in the container. Additionally, in some forms, the sealing members may be suitable for use with hydrophilic surfaces.

Figure 1:
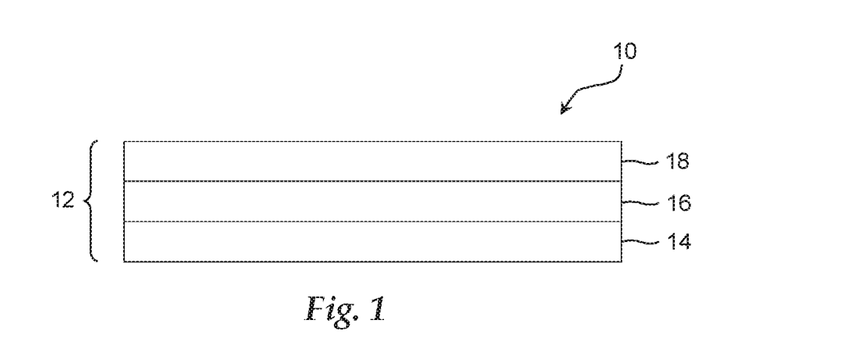
FIG. 1 is a cross-sectional view of an exemplary sealing member.

A sealing member for a container is described herein capable of being heat sealed to a container's mouth or opening, such as on a glass container. Turning to more of the details and as generally shown in the Figures, sealing members are shown. In FIG. 1, a sealing member 10 is provided as a laminate 12 formed from flexible sheet materials with a heat sealable layer 14 for bonding to a container's rim (not shown). The heat sealable layer 14 is designed to be heated via a membrane layer 16, such as via induction heating. As shown in FIG. 1, the heat sealable layer 14 may be positioned below and in contact with the membrane 16. In this form, the heat sealable layer 14 may be adhered directly to the membrane layer 16. However, other intermediate layers, adhesives, and the like may be used between the membrane layer 16 and the heat sealable layer 14.

The sealing member 10 may also include a polymer layer 18. The polymer layer 18 may be provided to add certain properties, as desired, to the sealing member 10. For example, the polymer layer 10 may be included to provide tear strength to the sealing member, provide insulation, provide a suitable surface to adhering to other layers, and the like.

The details of these components will be discussed in more detail below. Suitable adhesives, such as hot melt adhesives, may be used for the heat sealable layer 14. Such materials may include, but are not limited to, polyesters, polyolefins, polyolefin plastomers, ethylene vinyl acetate, ethylene-acrylic acid copolymers, surlyn, and other suitable materials. The heat sealable layer may include polymer materials that are heat activated to achieve its bonding characteristics.

According to one form, the heat sealable layer may be included in an amount of about 10 to about 50 $g/m^2$. For example, in one form, the heat sealable layer can be included in an amount of about 35 $g/m^2$. By one approach, the heat sealable layer may have a density of about 0.9 to about 1.0 g/cc.

In one form, the heat sealable layer may be a coextrusion of multiple materials. For example, the heat sealable layer may be a coextrusion of an ethylene acrylic acid copolymer and a polyolefin plastomer. For example, such a coextrusion may include Primacore 5980i in combination with Affinity GA 1950, both made by Dow. The amounts of each of these materials may also be varied. For example, the ratio of ethylene acrylic acid copolymer (such as Primacore 5980i) to polyolefin plastomer (such as Affinity GA 1950) may range from about 85:15 to about 95:5. In one form, the ratio of ethylene acrylic acid copolymer (such as Primacore 5980i) to polyolefin plastomer (such as Affinity GA 1950) is about 90:10.

The components of the heat sealable layer, such as ethylene acrylic acid, may be a higher molecular weight material. It is believed that, in some forms, higher molecular weight materials may be more suitable for use with hydrophobic substrates.

The amounts and ratios of the materials may be varied, depending on the types of containers that the sealing member is to be adhered to. For example, glass containers may include different treatments and/or coatings such that the specific ratios of the materials in a coextruded heat sealable member can be varied to achieve a desired seal strength and stability.

By one approach, the heat sealable layer may be a single layer or a multi-layer structure of such materials about 20 to about 40 microns thick. In some forms, the heat sealable layer is coextruded as a coating, such as on the membrane layer. According to one form, a tie layer may be first extruded onto the membrane layer and then the coextruded layer may be applied to the tie layer. The tie layer may help adhere the heat sealable layer to the membrane layer. In one form, the tie layer may be ethylene acrylic acid, such as in an amount of about 7 $g/m^2$, and the coextruded layer may be a polyolefin plastomer with ethylene acrylic acid in a ratio of about 90:10, such as in an amount of about 28 $g/m^2$. As ethylene acrylic acid is in both components, it may help adhere the heat sealable layer to the membrane layer.

The membrane layer may be an induction heating layer or other layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier. According to one form, the membrane layer may be about 12 to about 40 μm, and in some forms, about 20 μm.

According to one form, the membrane, such as an aluminum foil, may be corona treated. Corona treatment may help improve the bond between the membrane and the heat sealable layer. In one form, corona treatment may provide improved bonding to the foil and improved bonding to glass side of the heatseal layer. In one form, increased corona treatment level may help increase bonding to both the membrane and glass. In one form, the corona treatment may include about 25 $W/m^2/min$.

Above the membrane layer is one or more polymer layers. In one form, a polymer layer may be included that is a polyolefin or polyester film layer. In some approaches, the polymer layer may be about 5 to about 60 microns thick, though other thicknesses may also be used. The polymer layer may also be copolymers and/or blown film layers. Other polymer support layers may also be included such as PET, nylon, or other structural-type polymer layer(s). The sealing members may also include other layers as needed for a particular application, which may be layers in between the polymer layer and the membrane layer.

By one approach, the polymer layer may include a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the polymer layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

The sealing member may also include other layers or components, such as printing inks, additional polymer layers, foam layers, and the like. For example, multiple polymer film and/or foam layers can be used in combination for the sealing member. In one form, the sealing member may include one or more of polypropylene films, expanded polyethylene, low density polyethylene, and the like.

In some approaches, additional layers may also be included in the sealing member. For instance, thin adhesive layers (not shown) may also be used to secure layers as needed for a particular application or the layers may be composites of coextruded films. In one form, such layers may be about 0.2 to about a 0.5 mil (or less) adhesive, such as a coated ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

Figure 2:
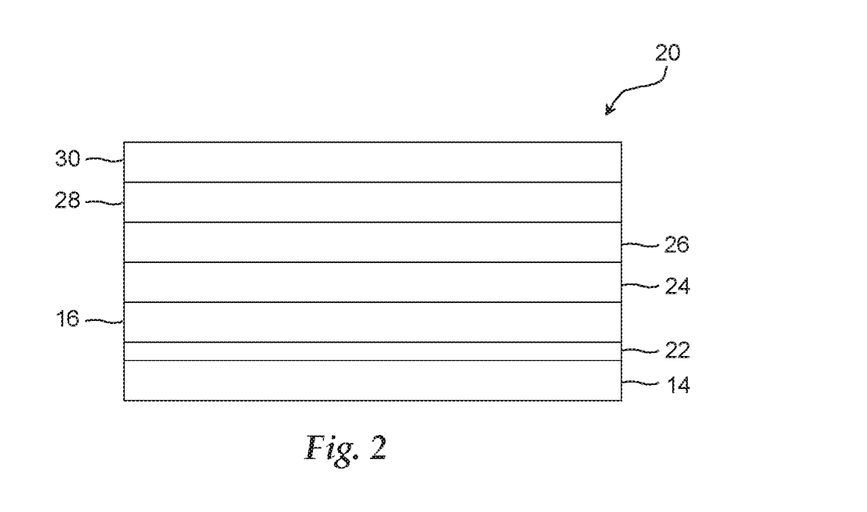
FIG. 2 is a cross-sectional view of another exemplary sealing member.

One form of a multi-layered sealing member is shown in FIG. 2. In this form, the sealing member 20 includes the heat sealable layer 14 and the membrane layer 16 with a tie layer 22 therebetween. In one form, the tie layer 22 is ethylene acrylic acid. The sealing member 20 also may include a first polymer layer 24, such as low density polyethylene layer, a second polymer layer 26, such as polypropylene film, a third polymer layer 28, such as expanded polyethylene, and a fourth polymer layer 30, such as a further polypropylene film. These polymer layers can be provided in a variety of different amounts and thicknesses as desired. In one form, the polypropylene films are about 20-40 µm thick, the expanded polyethylene is about 0.8 to about 2 mm thick and has a density of about 0.25 to about 0.42 g/ml, and the low density polyethylene can be provided in an amount of about 25 to about 35 g/m².

Figure 3:
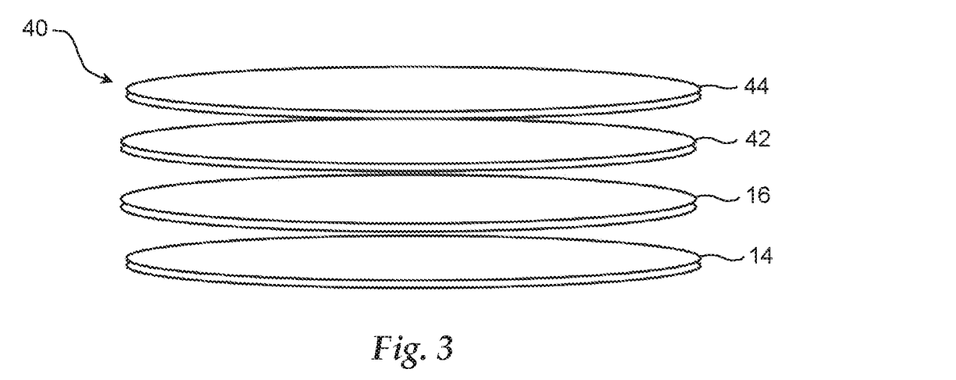
FIG. 3 is an exploded view of an exemplary sealing member.

Yet another form of a sealing member is shown in FIG. 3 in an exploded view. In this form, the sealing member 40 is already cut into a disc shape for installation on a container. In FIG. 3, the sealing member 40 includes a heat sealable layer 14 and the membrane layer 16. The sealing member 40 also includes a polymer foam layer 42 along with a polymer film 44.

As discussed above, the sealing member may also be configured with a backing layer or liner such that the sealing member is considered to have a two-piece construction. With the two-piece construction, the sealing member is temporarily bonded to a liner. In this construction, the sealing member is bonded to a container's rim, and the liner is configured to separate from the sealing member during heating to be retained in a cap or other closure used on the container.

The backing layer may be formed of a layer of food grade cardboard or pulpboard. In an alternative embodiment, the backing layer may be formed from a synthetic material such as a layer of foamed plastic material to which a paper layer has been adhered to the bottom surface. In one form, the backing layer includes an absorbent component. Where a synthetic liner is used, a paper layer may be used as a bottom layer in contact with a wax layer or adhesive which needs to be able to absorb the molten wax. The wax layer or adhesive can be used to adhere the backing layer to at least a portion of the polymer layer or other film or foam layer. In one form, the backing layer may have a thickness of about 600 to about 900 µm. In one form, the backing layer is designed to separate from the sealing member and be retained in the cap as the cap is removed from container.

Figure 4:
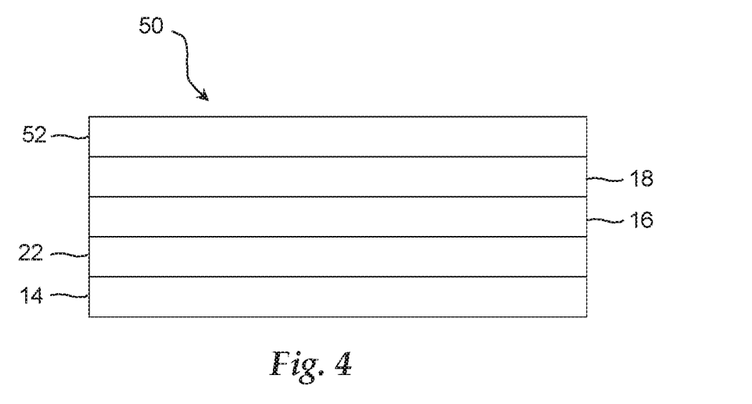
FIG. 4 is a cross-sectional view of another exemplary sealing member.

One form of a two-piece construction is shown in FIG. 4. In FIG. 4, the sealing member 50 includes the bottom heat sealable layer 14, the tie layer 22, the membrane layer 16, and the polymer layer 18. The sealing member 50 also includes a backing layer 52, such as a pulp layer, paperboard layer, and the like, as discussed above.

Figure 5:
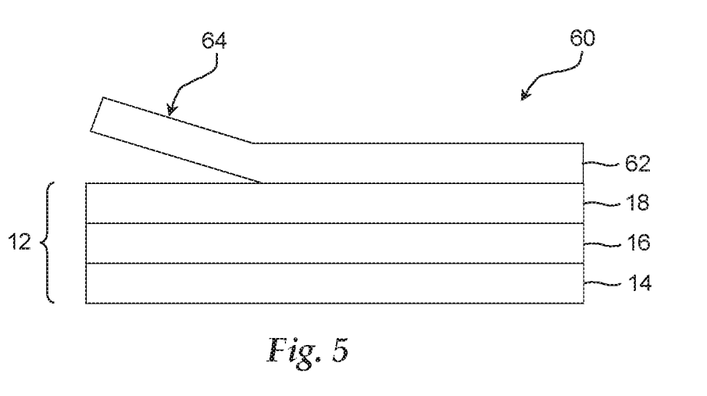
FIG. 5 is a cross-sectional view of another exemplary sealing member.

In one aspect, the sealing members herein may also include a pull or grip tab wholly within a perimeter of the sealing member. One form of this is illustrated in FIG. 5. In this form, sealing member 60 may include a polymer layer 62 that is partially adhered to laminate 12. The unbonded portion of polymer layer 64 may then pivot upwardly when grasped by a user such that the unbonded portion forms tab 64. While shown as generally incorporated into a sealing member similar to shown in FIG. 1, the polymer layer 62 and tab 64 may be incorporated into other embodiments, such as the other embodiments described herein.

In use, by pulling on the tab 64, a user can pivot the tab 64 upwardly and use the tab 64 to remove the sealing member 60 from a container rim or other container portion. In one approach, by pulling on the tab 64, the sealing member 60 is removed from the container rim in one piece. Similar tabs are described in a variety of references, such as U.S. Pat. Nos. 9,440,765, 9,913,513, and 9,028,963. The pull tab 64 may be formed as an upper laminate and can include any number of the different layers, similar to the layers discussed herein, including, but not limited to, polymer layers, polymer films, polymer foams, and the like.

The sealing members described herein may be suitable for use with containers holding materials that have fatty elements, oils, and the like. For example, fatty compositions may include materials such as chocolate spreads, nut spreads, spices, compositions containing palm oil, vegetable oil, highly saturated vegetable oil, coconut oil, olive oil, sunflower oil, and the like. It should be appreciated that the sealing member may also be used with other compositions, such as foods containing oils, fats, and the like, therein.

Figure 7:
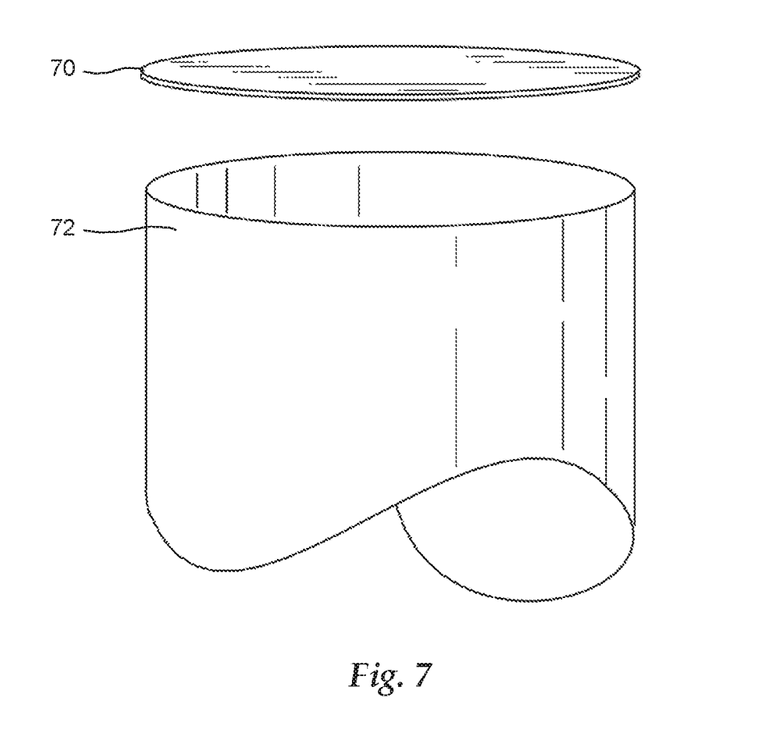
FIG. 7 is a cross-sectional view of an exemplary sealing member with a tab.

The sealing members herein may be used to seal a variety of different containers, such as glass containers and other types of containers. One embodiment is shown in FIG. 7 wherein sealing member 70 is used to seal container 72. It should be appreciated that sealing member 70 may take a variety of forms, such as those described herein.

The sealing member may be suitable for use with a variety of types of glass, glass treatments, and the like. Type III glass is typically treated in two or three ways—hot end, cold end, and induction treatment. With a "hot-end" treatment of tin or titanium tetrachloride, the thread and land area is shielded in the process, because when applying a metal closure, the tin will react with steel and rust. The treatment is a vapor so there is some reaction on the land area. A "cold-end" treatment includes oleic acid, monostearates, wax, silicon or polyethylenes. This is sprayed between rows of jars typically vertically from below. The land area may again have a little bit of this treatment on it because the treatment may be in the form of a spray. Similarly, it is undesirable to have the treatment on the thread area as this will affect the cap off-torque adversely. An induction treatment can also be added, but these tend to be proprietary to the glass maker and vary greatly in their use.

In certain circumstances, the hydrophobicity of the glass can impact the bond between the sealing member and the glass. For example, increasing hydrophobicity can decrease the bond strength. In these situations, the molecular weight of one or more of the heat sealable layer components can be modified. For example, with increasing hydrophobicity, the molecular weight of ethylene acrylic acid can be lowered to improve the bond.

In one form, the sealing member may be suitable for sealing to Tego Glas RP40 made by Arkema. This is a cold-end treated glass that can be used in operating temperatures above 80° C. where the glass coating does not degrade.

The glass may also include a hydrophobic coating, such as a silane coating. When such coatings are used, the molecular weight of one or more of the heat sealable layer components may be lowered to increase adhesion.

The various layers of the sealing member may be assembled via a heat lamination process forming a sheet of the described layers. Adhesive coating and/or extrusion lamination may also be used for one or more of the layers. During lamination, heating is applied to the web in order to activate the various heat-activated layers in the laminate structure in order to form the sealing member. The resulting laminate sheet of the sealing members can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. Heat or induction current or other sealing is then applied to seal the bottom assembly of layers forming the seal portion to the neck of the container.

The following examples are included to illustrate the disclosure herein and not to limit it. Unless otherwise stated herein, all parts and percentages are by weight.

Examples

In a first example, sealing members were prepared by coating Primacore 5980i on 29 micron aluminum foil as a tie layer. Next, Primacore 5980i was coextruded with Affinity GA 1950 in a ratio of about 90:10 to provide a coat weight of approximately 28 g/m$^2$. The resulting layered material was then laminated onto a backing liner.

Glass jars were sealed initially to understand the sealing window. The speed was 30 m/min and carried out judging seal strength and overheating evidence. The seal results are summarized in Table 1 below.

TABLE 1

Sealing window, using Enercon Superseal Max, 8 mm air gap, 30 m/min and 4 N on torque.

| Power | Seal | Comment |
|---|---|---|
| 70% | None | |
| 80% | Weak | |
| 85% | OK | |
| 90% | OK | |
| 95% | Good | |
| 100% | Strong | Some spokes |
| Power | Seal | Comment |

To initially test the seal, 8 jars were sealed at 100% power, 4 of which were filled with olive oil and left at ambient temperature. The remaining four were left for the duration of the weekend and vacuum tested two days later. This is summarized in Table 2 below.

TABLE 2

Initial vacuum test results

| Jar | Pressure | 20 seconds Pass/Fail | Time held |
|---|---|---|---|
| 1 | −200 mbar | Pass | >4 minutes |
| 2 | −200 mbar | Pass | >4 minutes |
| 3 | −300 mbar | Pass | >4 minutes |

TABLE 2-continued

Initial vacuum test results

| Jar | Pressure | 20 seconds Pass/Fail | Time held |
|---|---|---|---|
| 4 | −400 mbar | Pass | >4 minutes |
| Jar | Pressure | 20 seconds Pass/Fail | Time held |

The 4 jars filled with olive oil and held at ambient temperature remain sealed with no sign of leakage.

Additional jars were sealed and vacuum tested within 30 minutes. These were sealed at 95% and 100% and retested at −200 mbar and −400 mbar pressures. These results are summarized in Table 3 below:

TABLE 3

Further vacuum testing on 20 jars total

| Power | Pressure | 20 seconds Pass/Fail | Time held |
|---|---|---|---|
| 95% | −200 mbar | 5 × Pass | >1 min |
| 100% | −200 mbar | 5 × Pass | >1 min |
| 95% | −400 mbar | 5 × Pass | >4 min |
| 100% | −400 mbar | 5 × Pass | >4 min |
| Power | Pressure | 20 seconds Pass/Fail | Time held |

Table 3 shows the bottle tests were acceptable, nothing showing any failure even beyond 4 minutes at the lowest pressure.

Further jars were sealed with olive oil and also a mixture of olive oil and Palm oil in a ratio of 90:10 with induction heating at both 100% and 95% power, some held at ambient and some held at 30° C. 90% Rh.

Figure 6:
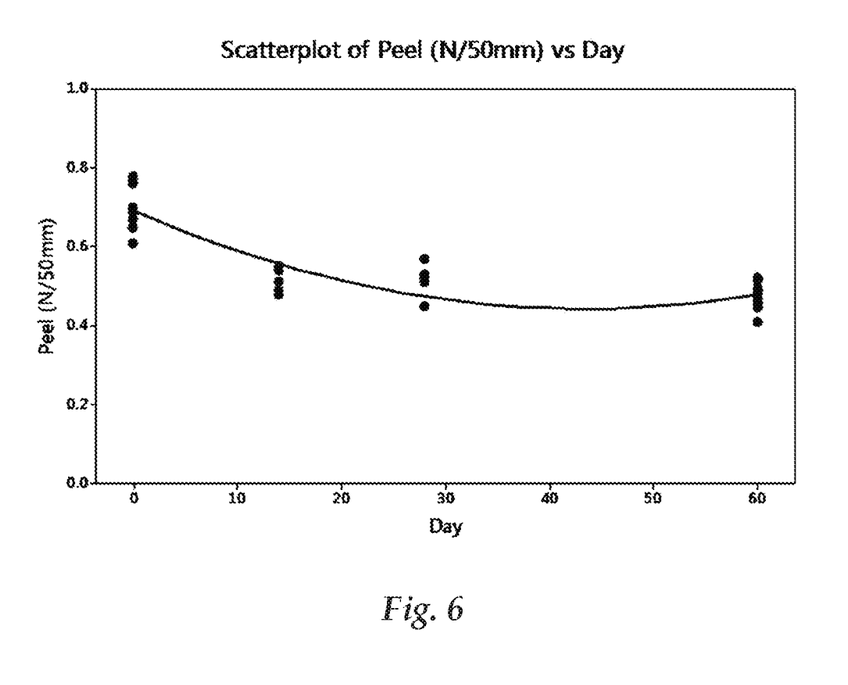
FIG. 6 is a graph illustrating peel stability.

Additionally, the peel stability of the material was also checked. This is displayed in FIG. 6.

Additional testing was performed on other types and treatments of glass. Some of the treatments included hydrophobic coatings, hydrophilic coatings, and untreated glass.

Migration of various components of the heat sealable layer were also analyzed. More specifically, many countries have various limits on the amount of migration of the seal components into the material/food in the container. More specifically, samples of a heat sealing member having Primacore 5980i in combination with Affinity GA 1950 in a ratio of about 90:10 were tested for migration of each of the components.

For example, the migration of the ethylene acrylic acid copolymer and polyolefin plastomer was tested for 10 days at 60° C. into vegetable oil. The results are shown in Table 4 below.

TABLE 4

| Replicate | Migration of Proprietary Additive µg/dm2 |
|---|---|
| 1 | <17 |
| 2 | <17 |
| 3 | <17 |
| Mean | <17 |

The limit of migration was 3 mg/kg such that the samples were acceptable.

Determination of residual acrylic acid content, by extraction into acetonitrile twice to ensure full extraction is shown in Table 5 below.

TABLE 5

|  | Residue Found | Migration of Acrylic Acid | |
|---|---|---|---|
| Replicate | μg | μg/dm2 | Mg/kg |
| Extract 1 | | | |
| 1 | 60 | 60 | 0.4 |
| 2 | 55 | 55 | 0.4 |
| 3 | 74 | 74 | 0.5 |
| Mean | 63 | 63 | 0.4 |
| Extract 2 | | | |
| 1 | <15 | <15 | <0.1 |
| 2 | <15 | <15 | <0.1 |
| 3 | <15 | <15 | <0.1 |
| Mean | <15 | <15 | <0.1 |

In many countries, the limit for acrylic acid migration is 6 mg/kg, therefore the samples were compliant with the requirement.

In view of the migration testing, it is believed that the heat sealable layer is suitable for use with fatty materials as the components used in the heat sealable layer have limited migration.

It will be understood that various changes in the details, materials, and arrangements of the process, liner, seal, and combinations thereof, which have been herein described and illustrated in order to explain the nature of the products and methods, may be made by those skilled in the art within the principle and scope of the embodied product as expressed in the appended claims. For example, the seals may include other layers within the laminate as needed for a particular application. Adhesive layers not shown in the Figures may also be used, if needed, to secure various layers together.

What is claimed is:

1. A sealing member for sealing to a rim of a container, the sealing member comprising:
   a bottom heat sealable layer configured for heat sealing the sealing member to a container rim, the bottom heat sealable layer comprising ethylene acrylic acid and a polyolefin plastomer;
   a membrane layer positioned above the bottom heat sealable layer, the membrane layer configured to transmit heat to the bottom heat sealing member to form a bond between the bottom heat sealable layer and the container rim; and
   a polymer layer positioned above the membrane layer.

2. The sealing member of claim 1 further comprising a tie layer including ethylene acrylic acid and the bottom heat sealable layer includes a coextrusion of ethylene acrylic acid and the polyolefin plastomer.

3. The sealing member of claim 1 wherein the bottom heat sealable layer comprises ethylene acrylic acid polyolefin plastomer in a ratio of about 85:15 to about 95:5.

4. The sealing member of claim 1 further comprising a backing layer, the backing layer including an absorbent component.

5. The sealing member of claim 1 further comprising a foamed polymer layer.

6. The sealing member of claim 1, wherein the bottom heat sealable layer, membrane layer, and polymer layer comprise a lower laminate portion of the sealing member and a second polymer layer is partially adhered to the lower laminate portion such that the unbonded portion of the second polymer layer forms a tab.

7. The sealing member of claim 1 wherein the membrane is a metal foil that has a thickness of about 20 to about 40 microns.

8. The sealing member of claim 1 wherein the membrane is corona treated.

9. A laminate for forming a sealing member, the laminate comprising: a bottom heat sealable layer comprising ethylene acrylic acid and a polyolefin plastomer;
   a membrane layer positioned above the bottom heat sealable layer, the membrane layer including a metal foil; and
   a polymer layer positioned above the membrane layer.

10. The laminate of claim 9 further comprising a tie layer including ethylene acrylic acid and the bottom heat sealable layer includes a coextrusion of ethylene acrylic acid and the polyolefin plastomer.

11. The laminate of claim 9 wherein the bottom heat sealable layer comprises ethylene acrylic acid and polyolefin plastomer in a ratio of about 85:15 to about 95:5.

12. The laminate of claim 9 further comprising a backing layer, the backing layer including an absorbent component.

13. The laminate of claim 9 further comprising a foamed polymer layer.

14. The laminate of claim 9, wherein the bottom heat sealable layer, membrane layer, and polymer layer comprise a lower laminate portion of the sealing member and a second polymer layer is partially adhered to the lower laminate portion such that the unbonded portion of the second polymer layer forms a tab.

15. The laminate of claim 9 wherein the membrane is a metal foil that has a thickness of about 20 to about 40 microns.

16. The sealing member of claim 9 wherein the membrane is corona treated.

17. A container and sealing member system comprising:
   a container having a rim area for receiving the sealing member, the land area being comprised of glass; and
   a sealing member having a bottom heat sealable layer, a membrane layer, and a polymer layer positioned above the membrane layer,
      the bottom heat sealable layer configured for heat sealing the sealing member to the container rim, the bottom heat sealable layer comprising ethylene acrylic acid and a polyolefin plastomer,
      the membrane layer positioned above the bottom heat sealable layer, the membrane layer configured to transmit heat to the bottom heat sealing member to form a bond between the bottom heat sealable layer and the container rim.

18. The system of claim 17 wherein the glass is Type III glass.

19. The system of claim 17 wherein the glass is cold treated glass.

20. The system of claim 17 wherein the glass includes a hydrophobic coating.

* * * * *